(12) United States Patent
Bonnet

(10) Patent No.: US 7,800,738 B2
(45) Date of Patent: *Sep. 21, 2010

(54) IMAGING DEVICE FOR RECORDING DEPTH

(75) Inventor: Gerhard Bonnet, Mannheim (DE)

(73) Assignee: Spheron VR AG, Waldfischbach-Burgalben (DE)

( * ) Notice: Subject to any disclaimer, the term of this patent is extended or adjusted under 35 U.S.C. 154(b) by 609 days.

This patent is subject to a terminal disclaimer.

(21) Appl. No.: 10/501,843

(22) PCT Filed: Jan. 20, 2003

(86) PCT No.: PCT/DE03/00154

§ 371 (c)(1),
(2), (4) Date: Nov. 30, 2004

(87) PCT Pub. No.: WO03/060426

PCT Pub. Date: Jul. 24, 2003

(65) Prior Publication Data

US 2005/0078296 A1    Apr. 14, 2005

(30) Foreign Application Priority Data

Jan. 19, 2002   (DE) ............................... 102 04 879

(51) Int. Cl.
*G01C 3/08*       (2006.01)
(52) U.S. Cl. .................. 356/5.03; 356/5.01; 356/28
(58) Field of Classification Search ............ 356/5.11
See application file for complete search history.

(56) References Cited

U.S. PATENT DOCUMENTS

| 3,182,312 | A | * | 5/1965 | Daniels ................... 342/69 |
| 4,579,417 | A |   | 4/1986 | Ih |
| 5,394,235 | A | * | 2/1995 | Takeuchi et al. ......... 356/73.1 |
| 5,394,238 | A |   | 2/1995 | Mocker et al. |
| 5,459,483 | A | * | 10/1995 | Edwards ................... 345/98 |
| 5,592,237 | A | * | 1/1997 | Greenway et al. .......... 348/716 |

(Continued)

FOREIGN PATENT DOCUMENTS

DE            100 45 535           4/2002

(Continued)

OTHER PUBLICATIONS

Nakamura, K. Hara, T. Yoshida, M. Miyahara, T. Ito, H., Optical frequency domain ranging by a frequency-shifted feedbacklaser, Mar. 2000, vol. 36, Issue: 3, pp. 305-316.*

(Continued)

*Primary Examiner*—Thomas H Tarcza
*Assistant Examiner*—Timothy A Brainard
(74) *Attorney, Agent, or Firm*—Baker & Daniels LLP

(57) ABSTRACT

The invention relates to a device for determining the distance of an object in local resolution mode, using a frequency-shifted feedback radiation source for irradiating the object with radiation that can be used to determine distance and using a position-sensitive object recording sensor. According to the invention, the frequency-shifted feedback laser for irradiating the object is equipped with an element for increasing the beat intensity of the emission frequency component and the position-sensitive object recording sensor is configured to record the beat intensity of the object and not the incoming radiation from the object.

28 Claims, 8 Drawing Sheets

U.S. PATENT DOCUMENTS

Figure 1:
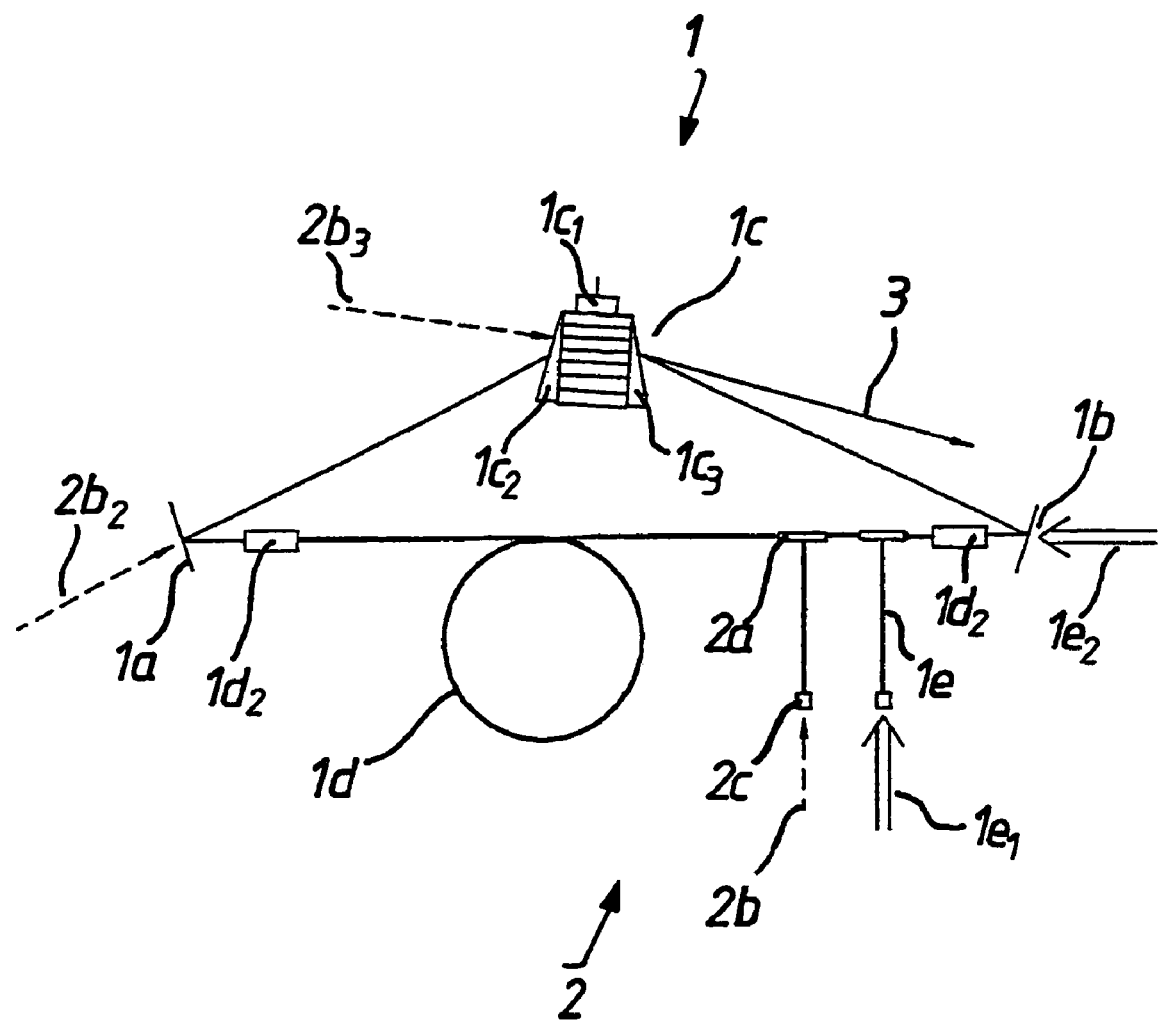

| | | | | |
|---|---|---|---|---|
| 5,592,327 | A | * | 1/1997 | Gabl et al. ............... 359/348 |
| 5,835,199 | A | * | 11/1998 | Phillips et al. ............ 356/5.03 |
| 5,955,992 | A | * | 9/1999 | Shattil ..................... 342/375 |
| 5,991,317 | A | | 11/1999 | Nighan, Jr. et al. |
| 6,147,779 | A | * | 11/2000 | Bolton et al. .............. 358/487 |
| 6,331,792 | B1 | * | 12/2001 | Tonietto ..................... 327/48 |
| 6,459,483 | B1 | * | 10/2002 | Shafer et al. .............. 356/247 |
| 6,462,705 | B1 | * | 10/2002 | McEwan ................... 342/175 |
| 6,570,704 | B2 | * | 5/2003 | Palese ........................ 359/349 |
| 6,594,061 | B2 | * | 7/2003 | Huang et al. ............... 359/239 |
| 6,603,537 | B1 | * | 8/2003 | Dietz et al. .................. 356/39 |
| 6,856,723 | B1 | * | 2/2005 | Ito et al. ..................... 385/27 |
| 7,061,620 | B2 | * | 6/2006 | Bonnet ..................... 356/489 |
| 2003/0184760 | A1 | | 10/2003 | Bonnet ..................... 356/489 |
| 2004/0257266 | A1 | * | 12/2004 | Pleva et al. .................. 342/70 |
| 2005/0117160 | A1 | | 6/2005 | Bonnet et al. |

FOREIGN PATENT DOCUMENTS

| | | |
|---|---|---|
| EP | 1 258 718 | 11/2002 |
| JP | 05232540 | 9/1993 |
| JP | 05-322699 | 12/1993 |
| JP | 10-082858 | 3/1998 |
| JP | 2000-081374 | 3/2000 |
| JP | 2002-005614 | 1/2002 |
| WO | WO 01/61302 | 8/2001 |
| WO | WO 02/23120 | 3/2002 |

OTHER PUBLICATIONS

Nakamura et al.: "Optical Frequency Domain Ranging by a Frequency-Shifter Feedback Laser", IEEE Journal of Quantum Electronics, IEEE, Inc., New York, Mar. 2000.

Otsuka et al.: "Experimental Suppression of Chaos in a Modulated Multinode Laser", Optics Letters, Mar. 1, 1997, pp. 292-294.

Nakamura, Koichiro et al., "A New Technique of Optical Ranging by a Frequency,Shifted Feedback Laser", IEEE Phototonics Technology Letters, vol. 10, No. 12, Dec. 1998.

Nakamura, Koichiro et al., "Observation of a highly phase-correlated chirped frequency comb output from a frequency-shifted feedback laser", Applied Physics Letters, vol. 72, No. 21, May 25, 1998.

Kowalski, F.V. et al., "Broadband continuous-wave laser", Optics Letters, vol. 13, No. 8, Aug. 1988.

Hale, Paul D. et al., "Output Characterization of a Frequency Shifted Feedback Laser: Theory and Experiment", IEEE Journal of Quantum Electronics, vol. 26. No. 10, Oct. 1990.

Nakamura, Koichiro et al., "Spectral Characteristics of an All Solid-State Frequency-Shifter Feedback Laser", IEEE Journal of Quantum Electronics, vol. 33, No. 1, Jan. 1997.

Littler, Ian C.M. et al., "The cw modeless laser: spectral control, performance data and build-up dynamics", Optics Communications 88, 1992.

Balle, Stefan et al., "Frequency shifted feedback dye laser operating at a small shift frequency", Optics Communications 102, 1993.

Bonnet, G. et al., "Dynamics and self-modelocking of a titanium-sapphire laser with intracavity frequency shifted feedback", Optics Communications 123, 1996.

English language abstract only.

* cited by examiner

IMAGING DEVICE FOR RECORDING DEPTH

This invention concerns the general claimed device and thereby deals with the measurement of the distance of objects using frequency shifted feedback radiation sources.

Techniques of measuring distances optically have been familiar for a long time. Besides echo sounding measurements, in which short light pulses are transmitted and the time elapsed until the backscattered or reflected pulse is measured, other familiar techniques involve interferometric processes.

An interferometric process entails splitting a light beam into a reference light beam and an object light beam. The object light beam is irradiated onto an object and reflected back from the object. The reference light beam and the object light beam are then superimposed on a light sensor and the distance to the object is derived from the superimposed signal. According to the configuration, this procedure produces very precise measurements; however, the depth measurement of extended objects at different locations creates difficulties.

Performing distance measurements with frequency deviation feedback lasers and frequency shifted feedback lasers (FSF laser) are also known. Examples of the FSF laser are to be found in the writings of F. V. Kowalski, P. D. Hale and S. J. Shattil "Broadband continuous-wave lasers," Opt. Lett. 13, 622 (1988), and P. D. Hale and F. V. Kowalski "Output characteristics of a frequency shifted feedback laser: theory and experiment" IEE J. Quantum Electron. 26, 1845 (1990) as well as K. NAKAMURA, T. MIYAHARA, M. YOSHIDA, T. HARA and H. ITO "A new technique of optical ranging by a frequency-shifted feedback laser," IEEE Photonics Technology Letters, Volume 10, 1998 Pages 1772 pp. An example of the application of such a laser for distance measurement is described in detail in the article "Observation of a highly phase-correlated chirped frequency comb output from a frequency-shifted feedback laser" by K. NAKAMURA, T. MIYAHARA and H. ITO, Applied Physics Letters, Volume 72, No. 21, pages 2631 pp. and in the article "Spectral Characteristics of an All Solid-State Frequency-Shifted Feedback Laser" by K. NAKAMURA, F. ABE, K. KASAHARA, T. HARA, M. SATO and H. ITO in IEEE-JOURNAL OF QUANTUM ELECTRONICS, Volume 33, pages 103 pp. Also refer to I. C. M. Littler, S. Balle and K. Bergmann "The cw modeless laser: spectral control, performance data and build-up dynamics" Opt. Commun. 88, 514 (1992) and S. Balle, F. V. Kowalski and K. Bergmann "Frequency shifted feedback dye laser operating at small frequency shift" Opt. Commun. 102, 166 (1993) and G. Bonnet, S. Balle, Th. Kraft and K. Bergmann "Dynamics and self-modelocking of a Titanium-Sapphire laser with intracavity frequency shift" Opt. Commun. 123, 790 (1996). The three latter documents expand on FSF lasers according to the current state of technology. These documents are also comprehensively categorized by reference in DE 100 45 535 for purposes of disclosure. A configuration in which an FSF laser is used for locally resolved distance measurement is described in DE 100 45 535.2 and PCT/EP 01/10416.

The principle of distance measurement with an FSF laser, which also contains an acousto-optical modulator in its resonator, in addition to an amplification medium, may be briefly presented as follows: amplification of light from the light waves entering into the amplification medium occurs for each frequency in which the amplification is greater than 1. In the case of all other frequencies the light is weakened as usual. The optical resonator now has preferred frequencies, similar to a vibrating string, so-called resonator modes. Each resonator mode has a specific frequency, i.e. it corresponds to light of a precisely specified wavelength. Those resonator modes, in which the amplification of the amplifying medium is greater than 1, will now be emitted preferentially.

This is principally the behavior of a laser without an acousto-optical modulator. If the acousto-optical modulator now becomes excited, the material oscillations create a moving grid that varies in its density at various places; the light traveling around in the resonator is diffracted at this density grid, wherein an interaction of the light photons with the phonons characterizing the density oscillations of the acousto-optical modulator occurs, which shifts the frequency of the diffracted light by the excitation frequency of the acousto-optical modulator. This leads to a slight shifting of the laser modes in the frequency, changing the frequency of a mode in time; when there is more than one mode, this also applies to all modes that are oscillating in the resonator. This means, however, that according to the extent to which the amplification profile runs above the amplification 1, the intensities of the individual oscillating modes are different and that the mode intensity changes with the frequency. It makes sense that the frequencies change for all modes equally with time. In other words, light that is emitted at different times will possess different frequencies.

If light beams that are irradiated over optical paths of varying length now flow to a location such as a detector, and thus were also emitted at different times from the laser, there must be a frequency difference between the two. This frequency difference can be detected as a beat frequency on a photo-sensitive element. The length of distance traveled can be determined from the beat frequency.

The familiar measuring set-up is described in greater detail in the documents referred to above.

In practice, it has been shown that the signals at the measuring receiver are strongly degraded by a high noise level. If the distance that is to be determined is fixed, a single sharp line would be observed without noise in the beat frequency. In reality, however, it turns out that instead a very broad structure instead of a sharp line is obtained with FSF lasers, which severely impairs the quality of the obtained measurement.

It is desirable to change the known setups and processes in such a way that the applicability can be increased.

The object of this invention is to make something new available for commercial application.

Claims for the solution to this task are made in independent form.

According to a first essential aspect of this invention, a device for the locally resolved determination of object distance is proposed with a frequency shifted feedback radiation source for the object irradiation with radiation that can be used to determine distance and a position-sensitive object detection sensor, wherein the frequency shifted feedback radiation source used for object irradiation is formed with a means for increasing radiation frequency component beat intensity, and the position-sensitive object detection sensor detects the beat intensity of radiation received from the object and the radiation not from the object.

Accordingly, it was not only recognized that the prevailing assumption in the interpretation of the state of technology that the beat portions coming from individual modes of the frequency shifted lasers would add up is not correct; rather, they obliterate one another. Surprisingly, the signal that can be achieved in the current state of technology with FSF lasers is expected to be based on the fact that noise occurs in the operation of the known lasers, i.e. occurrence of fluctuation of intensity and/or phase, which prevents the occurrence of a—theoretically actually to be expected upon more exact analysis—complete obliteration of the frequency components that are coherent to one another, as would otherwise occur. Noise caused by measurements using FSF lasers, according to the current state of technology, accordingly appears to be not a consequence of the noise of the laser; rather, it is the actual measurement signals themselves that are caused by the noise of the laser, i.e. its inherent fluctuations. Based on this knowledge it is now not only proposed that the radiation source be equipped with means to increase the intensity of the beat vibration of frequency components of the emitted beam, but it is also specified how this knowledge can be used to improve locally resolved object distance measurement.

In a preferred variation, the means for increasing radiation frequency component beat intensity is configured as a means for increasing non-stochastic radiation frequency component beat intensity, the means will therefore cause an intensity increase compared to that which is caused by spontaneous radiation, in particular in the amplification medium.

Typically an injection light source is used that injects light into the radiation source, i.e. provides a seed radiation field. As an alternative, it would also be possible to interfere with complete obliteration of frequency components via the measurement caused by spontaneous radiation in the stationary operating condition by modulating the pump light somewhat, which is typically less preferred due to the level lifetimes, etc. or for example by bringing about a fast loss mechanism in the amplification medium itself. The providing of an injection light source, however, is especially advantageous because it is an easy to build option through which a number of advantageous configurations can be realized.

A particularly advantageous variation for an injection light source is an injection laser. The radiation of the laser can be guided into the resonator, in particular, in and/or to the amplification medium of the frequency shifted feedback radiation source.

It is preferred when the injection light source emits light at a wavelength that is close to the wavelength at which the amplification of the amplification medium of the frequency shifted feedback radiation source is at 1, it may optionally be irradiated close to the upper and/or lower threshold wavelength. The frequency of the injected light radiation will typically be within the range in which the amplification G is greater than 1 and not outside of that range. For seed radiation injected very close to the threshold, and, particularly, modulation of the same, this threshold may temporarily be exceeded. It would always be preferable to select the irradiation frequency in such a way that amplification occurs no later than after a few resonator revolutions.

It is preferred when the injection light source emits narrowband radiation wherein narrow band radiation is referred to the amplification bandwidth of the amplification medium of the frequency shifted feedback radiation source. In this instance, narrowband can refer to a bandwidth no greater than 5%, preferably not over 1% of the amplification bandwidth. In a particularly preferred variation, a single-mode injection laser with a precisely defined, modulating frequency and/or amplitude can be used for the injection.

The injection light radiation preferably varies with regard to intensity and/or phase. This variation can occur due to a regular modulation, i.e. modulation of intensity and/or phase subject to preset principle moderation or limitations, said modulation not necessarily needing to be uniform.

It is especially preferred that the modulation not be constant but the intensity and/or the phase of the modulation of the injection light radiation vary with time, which occurs best in a periodic manner. It is especially preferred when the frequency of the intensity modulation is changed within specified intervals because a linear variation of the modulation frequency of the injection light radiation significantly simplifies an assessment of received beat vibration signals for measuring distance.

When a modulation of the radiation emitting from the injection light source with respect to phase and/or intensity is performed, it is preferred that the frequency of this modulation lies close to the frequency occurring from the so-called chirp rate and the distance that is determined with the radiation source instantaneously. The chirp rate is provided by the frequency of the acousto-optical or other modulator within the frequency shifted feedback radiation source referring to the revolution period of the radiation in the resonator of this source.

It may be mentioned that the radiation source is typically a frequency shifted feedback laser. This may work in particular in infrared ranges that are safe to the eye. The wavelength ranges that are technologically well developed and particularly cost-efficient for telecommunications devices may also be used for purposes of this invention, which opens the possibility of accessing cost-effective available elements for designing configurations and devices.

A device is preferred in which the frequency shifting feedback radiation source is formed by a laser and the means for increasing radiation frequency component beat intensity is a frequency-modulated seed laser with seed light irradiating into the first laser, wherein the device also comprises a means to adapt the frequency of the seed laser frequency modulation to distances to be measured. In other words, it is proposed that the device for locally resolved object distance measurement comprises a tunable seed laser and the beat signal is determined depending on the seed laser tuning.

It is especially preferred when the seed frequency is gradually modified in order to provide sufficient time for setting a stable beat and its identification on the sensor. The seed frequency can be modified accordingly in steps and be kept constant for a specific measurement period. It is also possible to wobble the seed frequency by a specific value, which prevents frequency hopping of the seed frequency tuning from lying in such a way that specific distances can not be determined and thus no and/or only inexact distances for individual objects or object partial ranges can be determined. The seed frequency can also be changed systematically in different passes with different steps and the same wherein it is understood that the object distance is then determined taking into consideration the signals from several transmissions.

It is particularly advantageous when the object detection sensor signals related to beat intensity detected using the object detector sensor are filtered. A filter can be formed in particular for filtering out only the alternating signal portions. It is particularly advantageous that a relevant signal only occurs in the range of the seed frequency and therefore can be filtered on this seed frequency in a narrow band, wherein the filter can run with the seed frequency and/or has a specific narrow band. It may be pointed out that artifacts can lead to sharp frequency components being present in a high portion in the conditioned object detection sensor signal wherein these frequency components can be different from the seed frequency. Such interference signals may be filtered out particularly well with narrowband filters.

The object detection sensor signal conditioning typically comprises a signal amplification, wherein it is particularly preferred to provide the amplification after the filter step because very strong amplification is possible there, which also allows very weak beat signals to still be evaluated. It is clear that regulated and/or controlled signal conditioning, in particular with respect to amplification that is regulated and/or amplification that is set in another way, is particularly preferred to be able to also measure at great distances. In particular it is possible to prescribe a dependence of the respective amplification of the relevant seed frequency in order to take into consideration in such a way that a given seed frequency corresponds to a specific distance and, accordingly, a distance-proportional amplification with, for example, $1/r^2$- or $1/r^4$- can be sensible.

Typically, therefore, the signature of the object detection sensor signal will be detected depending on the seed frequency tuning. Provision can be made for the maximum value of the object detection sensor signal to be determined during the seed frequency tuning wherein, as previously mentioned, the seed frequency tuning can proceed gradually or an effective value is ascertained that is received as a real effective value after rectification and low-pass filtering of the preferred band-passed filtered amplified object detection sensor signal and/or the effective value can be determined in a specific frequency window for purposes of distance measurement.

It is possible to use derivatives of the object detection sensor signal with the seed frequency modification or, insofar as these occur gradually, the variation of the object detection sensor signal gradually for the purpose of measuring distance. Since noise can cause fast signal fluctuations and thereby large differentiations, it is possible to diminish the influence of noise through simultaneous viewing of a signal comparator output that ensures that changes of the derivatives be taken into consideration only when the conditioned object detection sensor signal is sufficiently large because in such cases it can be assumed that there is no exclusive noise influence. The evaluation can ascertain a distance measured value with regard to the time between a preset characteristic, such as achieving a maximum in the object detection sensor signal from the beginning of a seed frequency sweep or a successive frequency change. The fact that this can happen when using analog circuits with which the respective maximum is maintained and a "maximum achieved signal" is generated, as soon as an object detection sensor signal no longer rises in order to enable the registration of a seed frequency related or sweep time duration signal counter value into a digital register that exceeds this "maximum achieved signal, has been mentioned.

An especially preferred variation consists of using an FSF laser emitting in infrared with frequency shifted feedback as a radiation source. On the one hand this provides an operation in corresponding infrared ranges that is inherently safe to the eyes and on the other hand makes possible irradiation of an object simultaneously in visible light without changing the visible colors there. It may be mentioned that it is possible to determine first the beat intensity and then capture the natural light from the object with one and the same object detection sensor in time consecutively. In such a case it is clearly preferable to use different signal conditionings for signals from one and the same pixel. There is also another possibility to perform object detection with a multi-pixel chip such as a CMOS or CCD array, which in particular is known for being able to be configured for multi-color detection, wherein the preferred, but not required, infrared irradiation of the object or their superimpositions on the chip with a radiation portion irradiating via a reference path can be detected as a "color." When separate sensor element fields for different colors or IR and visible light are used, image orientation agreements can be conducted in the familiar way through image orientation correction steps.

Figure 2:
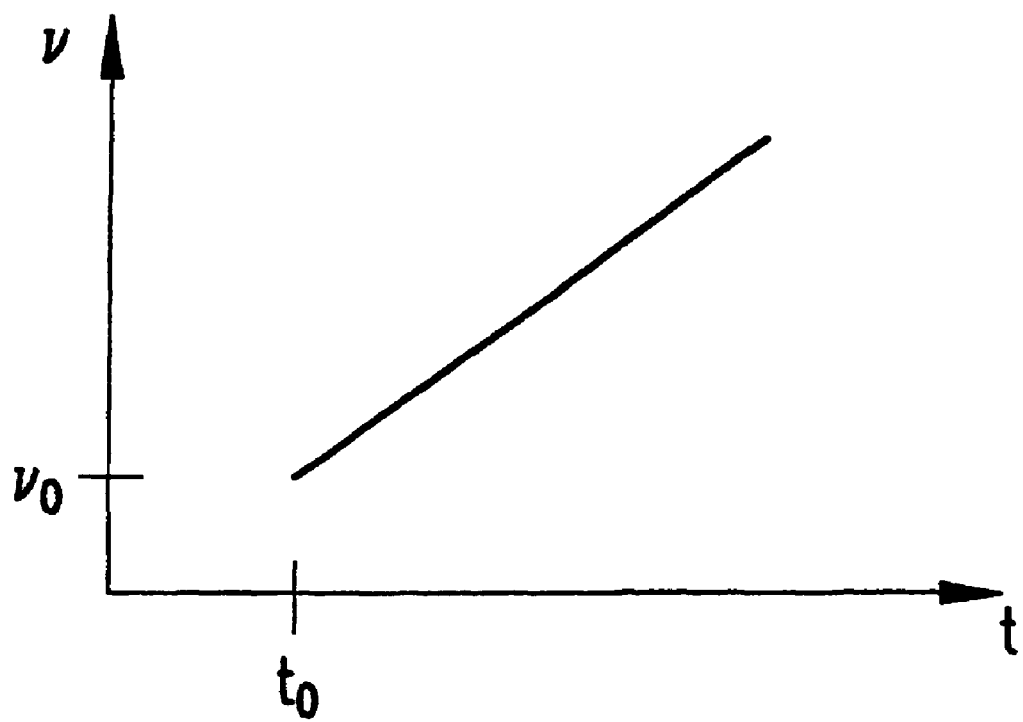
Figure 3:
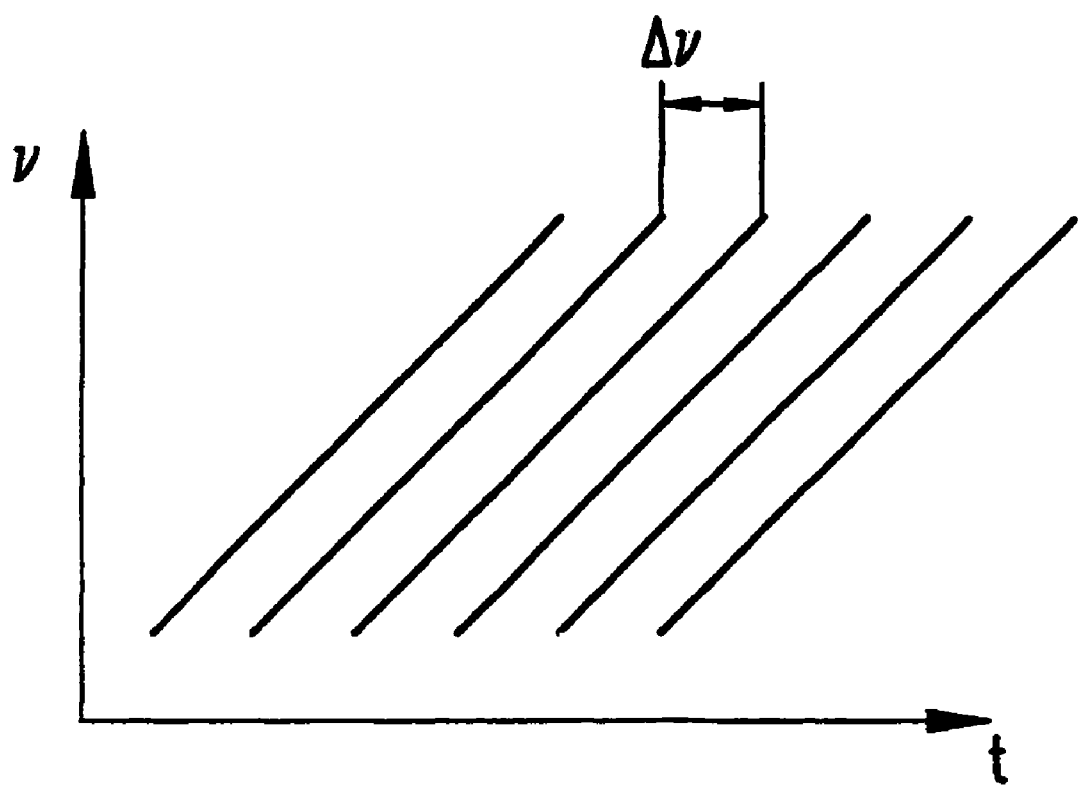
Figure 4:
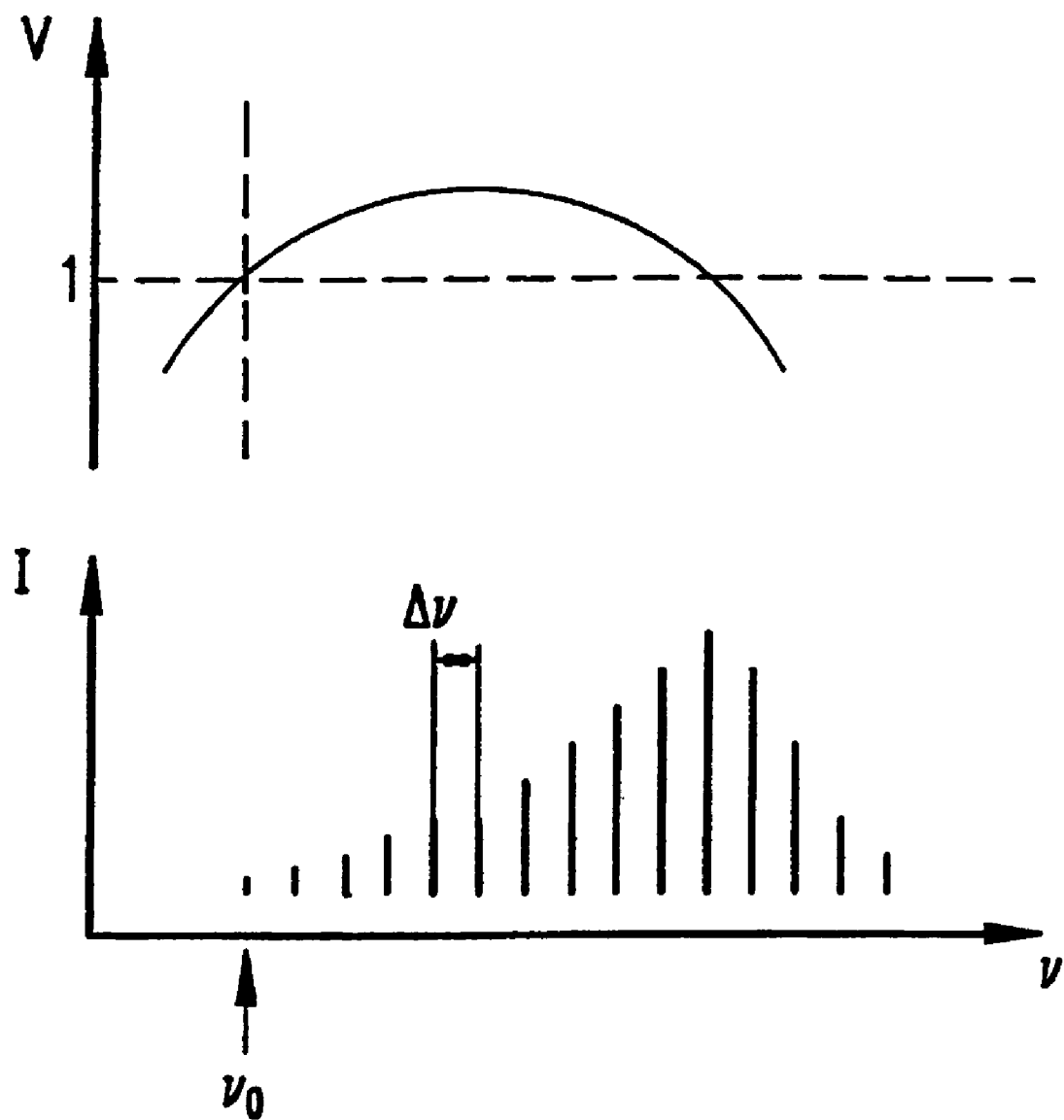
Figure 5:
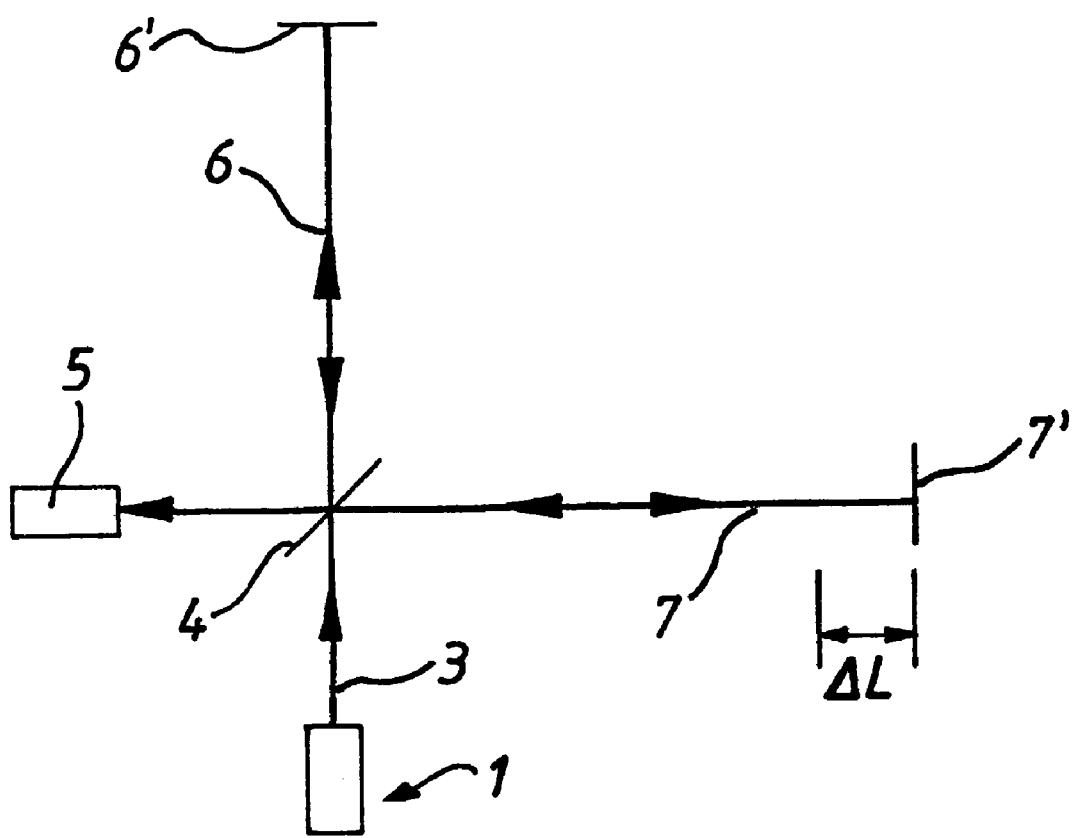
Figure 6:
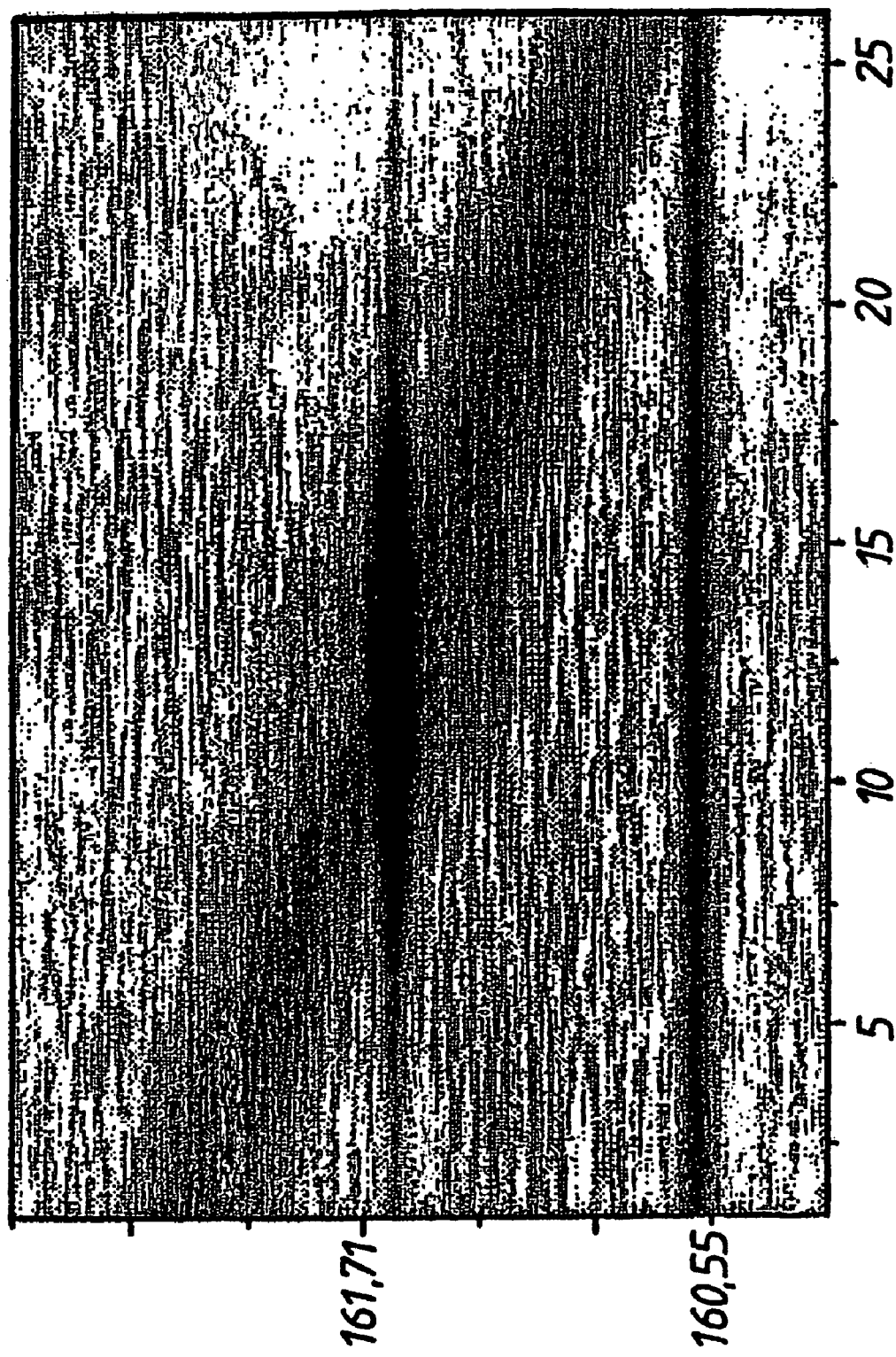
Figure 7:
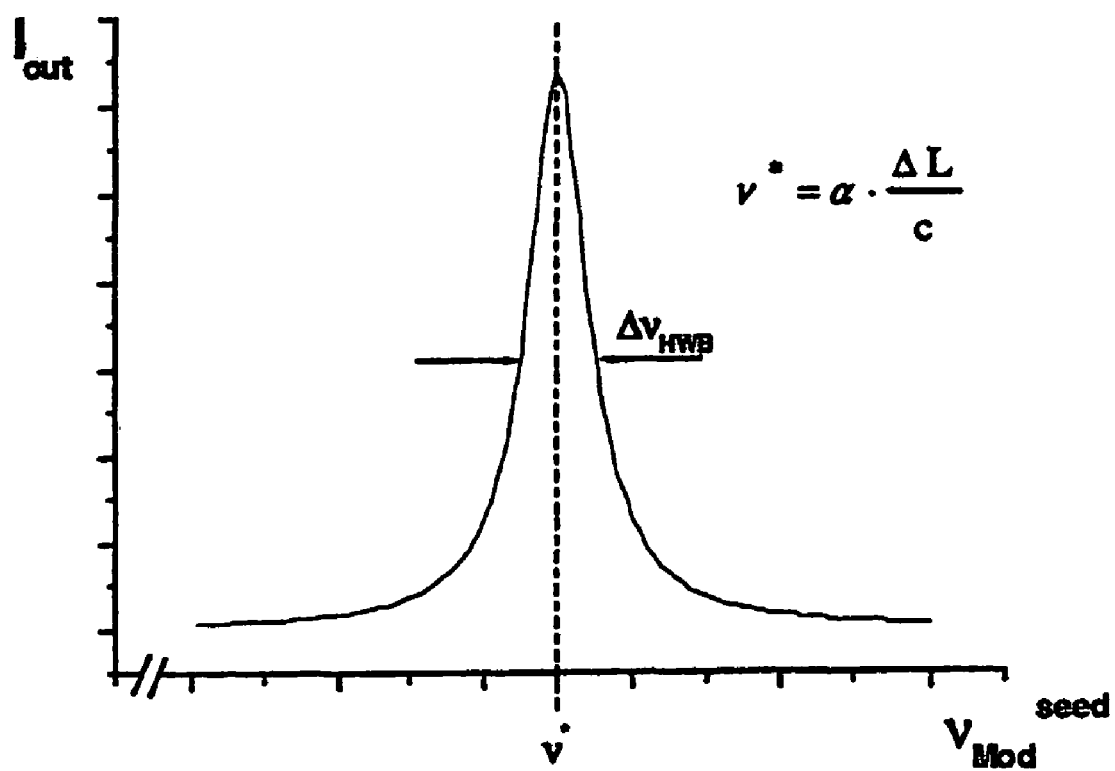

The invention will now be described in the following drawing only by way of example. The figures show the following:

FIG. 1 a schematic design of a frequency shifted feedback radiation source for a device that conforms to the invention;

FIG. 2 the frequency variation of a single laser mode when using a linear chirp over time;

FIG. 3 the synchronous variation of all components (modes) of a radiation light source with frequency shifted feedback;

FIG. 4 the frequency spectrum of an FSF laser for the given amplification curve (top of image);

FIG. 5 a schematic design for a distance measurement with a configuration that conforms to the invention;

FIG. 6 a grayscale display of a beat frequency spectrum, as can be achieved from the current state of technology, with artifact structures that are independent of position and a weak measurement signal that is recognizable as stripes running diagonally through the image;

FIG. 7 an example of a beat frequency signal dependent on seed radiation frequency modulation.

Figure 8:
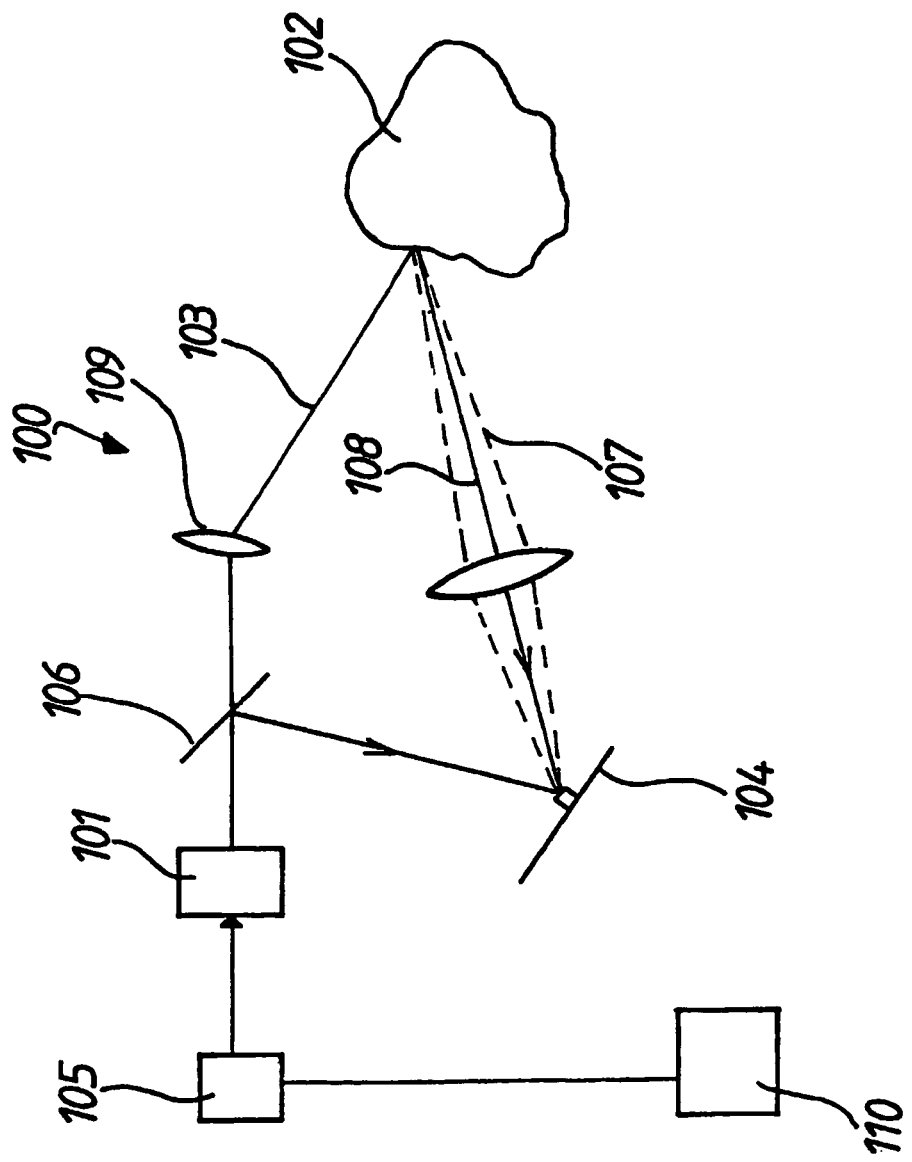

FIG. 8 an example of a design of a device that conforms to the invention.

As shown in FIG. 1 a general frequency shifted feedback radiation source 1 includes a means 2 for increasing radiation frequency component beat intensity.

The frequency shifted feedback radiation source 1 in this example is a ring laser with frequency shifted feedback. The ring resonator of the ring laser 1 is formed by two high reflecting mirrors $1a$, $1b$ and an acousto-optical modulator $1c$ to which a piezo element $1c_1$ as an actuator and input and outputs prisms $1c_2$, $1c_3$ are associated and then configured in the resonator ring in such a way that the zeroed diffraction order, displayed as a beam 3 that can be decoupled while the first diffraction order guides the light circulating in the resonator. The acousto-optical modulator $1c$ is selected in such a way that diffraction efficiencies of more than 90% result for the first diffraction order frequency shifted in the familiar way by the acousto-optical modulation. The geometry is also selected in such a way that the prisms $1c_2$, $1c_3$ allocated to the acousto-optical modulator $1c$ are compensated with regard to their dispersion and yet a compact design is still possible.

A fiber medium $1d$ is arranged between both high-reflecting mirrors $1a$ and $1b$ to which a fiber launch and catcher optics $1d_1$ and $1d_2$ are arranged. Energy from a point laser designed here as a diode laser (not shown) is irradiated into the fiber so that it can be used as an amplification medium. The launch occurs on a fiber coupler $1e$. The displayed fiber is a conventional ytterbium fiber with a large useable amplification bandwidth of at least 70 nm, in this example, in the spectral range at 1.2 μm; such elements are easily available from the field of optical telecommunications, exactly like other, equally applicable configurations, for example, fiber lasers on the basis of YAG at 1.06 μm with a few nm of bandwidth or erbium of 1.5 μm could be used.

The configuration of the FSF laser, as it has been described up to this point, is essentially conventional. Means for increasing radiation frequency component beat intensity will be used. For that purpose there is a fiber coupler $2a$ that is used to couple injection light into the fiber, indicated at $2b$, using a launch optic $2c$. The injection light $2b$ comes from an injection laser (not shown) that with regard to its amplitude and the phase of the optical carrier can be modulated in a temporally variable manner. The injection or seed laser emits radiation whose wavelength lies up close to the lower position G=1 of the amplification profile of the FSF ring laser 1 or the fiber $1d$ displayed for the up-chirp, compare FIG. 4, where in the upper portion of the image the amplification profile is drawn as a continuous line, together with the amplification threshold 1, which is drawn horizontally and wherein the optical carrier frequency of the seed laser is entered as a vertical, dash line.

It can be mentioned at the same time that instead of, and/or besides, a launch via a fiber coupler $2a$, a launch of an injection light beam through one of the high-reflecting mirrors would also be possible, as indicated with mirror $1a$ through beam $2b_2$, and/or a launch could occur into the acousto-optical modulator, as indicated by arrow $2b_3$. For the sake of completeness, it is also indicated here that the pump light that is different in this instance from the injection light, indicated with $1e1$, can not only be launched via a fiber coupler into the amplifying fiber $1d$ from the pump light beam $1e_1$, but, for example, a pump light launch is possible via the high-reflecting mirror as indicated by the beam $1e_2$ close to the mirror $1b$.

This configuration is operated as follows:

A pump light is irradiated on the fiber $1d$ to bring about an inversion that makes laser operation possible. Then the piezo driver $1c_1$ of the acousto-optical modulator begins to oscillate so that the ring of the frequency shifted feedback laser is closed. Light that is now emitted from the fiber can now run over the mirror $1a$, through the prism $1c_2$ and the acousto-optical modulator $1c_1$ and the prism $1c_3$. The major portion of this light will thereby be irradiated into the fiber $1d$ corresponding to the high diffraction efficiency of the acousto-optical modulator linked to the mirror $1b_1$.

When passing through the acousto-optical modulator $1c$, the frequency of the light changes simultaneously. The light that has run in the direction of the acousto-optical modulator with a preset frequency at the mirror $1a$, will therefore strike at the other high-reflecting mirror $1b$ with a shifted frequency or wavelength. This light with shifted frequency is amplified in the fiber $1d$, runs again over the mirror $1a$ under further frequency shifting through the acousto-optical modulator $1c$ to the mirror $1b$, etc. This leads to the shifting of the frequency upon each pass. The speed used to change the frequency depends on the time it takes for the light to make a pass and how strong the frequency shift in the acousto-optical modulator is. The shift occurs for all components or modes that can be amplified in the resonator in the same way so that the frequency comb represented by the modes of the FSF laser is gradually shifted in a synchronous manner. There is a so-called "chirp." This is shown in FIG. 3, whereas FIG. 2 illustrates the variation of the frequency for a given linear chirp.

This light is now used to measure distances. This will only be discussed in principle first for a not yet locally resolved interferometer configuration, as shown in FIG. 5, in which the invention light source 1, a beam segmenting element 4 in the catcher beam 3 of the light source 1, a reference path 6 to a reference surface 6' and measurement path 7 to a measurement object 7' are displayed, wherein the beams from the reference object 6' and from the measurement object 7' are guided to a detector 5.

The situation that arises in such a configuration for taking the seed source into operation on the detector, can be seen in image 6. A grayscale display of the beat frequency spectrum is displayed for a laser configuration as a function of the path difference $\Delta L$ of the arms 6 and 7 of the measurement configuration. In the grayscale display, lines can be seen that are position-independent and do not vary with the path difference $\Delta L$ and thereby run horizontally in the image; the lines are conditioned by a standing wave portion in the acousto-optical modulator and repeat themselves after the resonator pass run time. Further, it can be seen that the actual measurement signal has strong noise interference, which runs diagonally as a dark stripe through the image.

Now the injection light source is put into operation and with a carrier frequency close to the lower range of the ampli- fication curve, i.e. just still inside that range, in which the amplification is greater than 1. The optical carrier frequency, which is drawn in vertical dotted lines, is modulated, and amplitude modulated in this example, wherein the modulation itself is also not constant, but varies with a frequency that is approximately determined from the so-called chirp rate $\alpha$ i.e. the frequency shift per resonator pass divided by the resonator pass time and is further determined by the light run time along the path difference $\Delta L$ between the measurement beam path and the reference beam path as in the design of FIG. 5. The modulation frequency of the injection light is therefore not kept constant, but varied by this so-called signature value, i.e. by the value which results from the chirp rate $\alpha$ and $\Delta L$ through the formula $$\Delta v = \alpha \times \Delta L \times c^{-1}$$

wherein c is the speed of light. The modulation frequency is changed by this signature frequency and is preferred in a linear saw tooth form. An intensity is yielded at the detector, as is displayed in FIG. 7. It turns out that a very significantly manifested, sharp intensity peak of the beat signal can be obtained, i.e. the signal is degraded very little from noise and in particular shows a minor degree of noise and thereby a more precise measurement than has been possible up to this point in the current state of technology. It is significant that the injection radiation modulation and the beat frequency intensity are tightly linked to one another and a beat frequency intensity maximum is then achieved when the injection modulation frequency corresponds to the frequency expected for a given path difference taking the chirp rate into account.

Presently this is justified as follows: Through the injection of the irradiation of the injection laser at the edge of the amplification range, modes are shifted in the resonator in steps $\Delta v_{AOM}$ over the entire amplification bandwidth so that the laser does not end up in a stationary, practically noise-free equilibrium at which it otherwise would sink. Accordingly, it seems that the conventional image of the coming into position of the beat spectrum is incorrect and actually in a noise-free instance the intensity of a beat would disappear.

In can now be determined that the structure width of the received signal structure is determined by the amplification bandwidth, i.e. a high bandwidth of the radiation light source with the frequency shifted feedback, i.e. of the FSF laser, leads to a good spatial resolution. Because additionally the distance measurement precision is essentially determined by the chirp magnitude, it is desirable to select a large frequency shift through the acousto-optical modulator and a small laser resonator length of the FSF laser resonator.

It can be determined that during a distance measurement and, if necessary, during successive distance measurements at a specific time interval, a very high degree of precision can be achieved even during speed and/or acceleration measurements that essentially only depend on the driver frequency consistency of the acousto-optical modulator, as well as the laser resonator length stability during the measurement time. In addition, only magnitudes such as the precision of the beat frequency determination need to be taken into consideration. It is evident that systematic resolutions and precisions of $10^{-6}$-$10^{-8}$ can be achieved. Through the significantly improved signal noise ratio it is also possible to perform measurements using very low power levels because only a high frequency portion in the detected signal must be detected as a beat and this portion consists of known or approximately known frequencies.

As shown in FIG. 8, a device numbered 100 for locally resolved object distance measurement 100 includes a frequency shifted feedback radiation source 101 for irradiation of an object 102 with irradiation 103 that can be used for distance measurement and a position-sensitive sensor 104 wherein a seed laser 105 is allocated to the frequency shifted feedback radiation source 101, which in this case is configured as an infrared frequency shifted feedback laser 101; the seed laser feeds modulated and gradually fluctuating seed light into the amplification medium of the FSF laser 101. The object detection sensor 104 receives on the one hand the irradiation 103 from the object, on the other hand, reference light via a beam splitter unit 106 via a reference path of predetermined length from the FSF laser 101 as well as visible light from the object 102, which is indicated by beams 107. A reference may be made to the fact that directing of the FSF light from the radiation source 101 to the object 102, and conventional optical elements, as indicated by 109, can be used for collecting light or distance-measuring irradiation from the object 108 to the object detection sensor 104, for splitting the beams, a dimmer, etc. The design can conform to traditional rules of the current state of technology taking into consideration the respective wavelengths, desired image properties, etc. A reference may be made to the fact that a configuration is possible where an all-around monitoring and detection is possible, the objects forming a sphere or partial sphere around the device, which is possible using a suitable mechanical rotation and/or rocker seating for all or a part of the device components.

As can be seen from the general principles of the FSF laser using seed injection described above, the result will be a beat signal on the sensor 104 through the superimposition of the reference light and the light 108 received from the irradiated object 102. This signal becomes maximum when the seed frequency that is used to modulate the seed laser 105 results from the chirp rate of the irradiation of the frequency shifted feedback radiation source 101 and the additional distance traveled from the object beam 108-103 according to the previously stated formula. An evaluation configuration 110 is allocated to each pixel of the sensor 104, laid out here as a CMOS array, with which the electric signal from each pixel of the object detection sensor 104 is filtered in narrow band and conditioned by appropriate amplification and then fed onto a maximum holding circuit arranged in the evaluation configuration 110, which at each point in time compares an immediate value of the conditioned signal with the previously observed maximum and provides a stop signal, when such a maximum is not reached as indicated by the decline of the signal. The stop signal is forwarded to a counter which begins to count at the beginning of a seed frequency signal sweeps over several, gradually modified seed signal frequencies. The stop signal stored for each pixel corresponds to a frequency at which the object detection sensor signal signature shows its maximum. By referencing the known chirp rate, the geometric relationships, in particular regarding the reference beam path length, and the temporal seed frequency signal ratio, a corresponding distance value of the object range imaged on the pixel can be determine for each pixel. Parallel to determining the distance of the object, as described above, the conventional two-dimensional image can be obtained digitally and using appropriate electronic circuitry, for example, a superimposition of the images can be achieved. In this way, the depth values can be determined at one point in a recorded two-dimensional surface image and a spatial image can be obtained. A reference may be made to the fact that illumination fields can be determined very well using this configuration, which makes image synthesis using retrieval of the shape of recorded environments, which then serve as objects, much easier.

The invention claimed is:

1. An arrangement for distance measurements using a frequency shifted laser radiation source, said arrangement comprising:

an object detection sensor;

a frequency shifted feedback laser resonator having a pumped gain medium therein with a gain greater than unity so as to emit laser light having a plurality of frequency components changing with time in a chirping manner;

means for splitting said emitted laser light having said plurality of frequency components changing with time in a chirping manner into an object beam for irradiating an object and a reference beam, the object sensor being adapted to receive laser light radiation coming back from an object illuminated with the object beam light and being at a distance to be determined and also being adapted to receive said reference beam via a reference path not including the object in such a manner that the laser light radiation coming back from the object and the reference beam interfere with one another on the object sensor, said interference producing a signal by the beating of a plurality of frequency components that change with time in a chirping manner and which comprise laser light radiation coming back from said object illuminated with the object beam and beating with the plurality of frequency components that change with time in a chirping manner and which comprise the reference beam received at the sensor via said reference path not including the object, the intensity of said beat signal allowing for the determination of the distance of the object in response to the intensity of said beat signal;

wherein the frequency shifted feedback laser radiation source further comprises a means for injection of narrow banded, non-pumping, modulated seed laser light into the frequency shifted feedback resonator, said means for injection modulating the seed laser light such that said intensity of said beat signal is increased.

2. The arrangement according to claim 1, wherein the seed laser light is phase modulated.

3. The arrangement according to claim 1, wherein the seed light has a wavelength close to the wavelength where the gain of the pumped gain medium is unity so that amplification of the seed laser light occurs at latest after a few resonator round trips.

4. The arrangement according to claim 1 or 3, wherein the seed laser light is modulated around a signature frequency of $$\delta v = \alpha \times c \times \delta_1,$$

wherein $\alpha$=chirp rate, c=speed of light, and $\delta_1$=distance to be determined.

5. The arrangement according to claim 4, wherein the modulation frequency is periodically varied around the signature frequency of $\delta v = \alpha \times c \times \delta_1$.

6. The arrangement according to claim 4, wherein the seed modulation frequency is changed in a stepwise manner and wherein said means for changing is adapted to maintain the seed modulation frequency constant for a given measuring time T and/or to wobble around an average value of a respective seed modulation frequency value.

7. The arrangement according claim 4, wherein the injection laser is a single mode laser.

8. The arrangement according claim 7, wherein the means for injection is a laser that has a frequency width of less than 5% of the gain of the frequency shifted feedback laser radiation gain medium.

9. The arrangement according claim 8, wherein the injection laser injects the non-pumping injection laser light into the gain medium of the frequency shifted feedback laser.

10. The arrangement according to claim 1, including a filter for filtering the beat intensity related object sensor signals determined at the object detecting sensor.

11. The arrangement according to claim 10, wherein the filter is adapted for filtering of components changing with the seed frequency.

12. The arrangement according to claim 11, including a signal amplification for an object detection sensor signal having an amplification stage subsequent to a filter stage and at least one regulating or control circuit for setting a given amplification of the sensor signal.

13. The arrangement according to claim 12, including a stage for determining a distance in response to an object detection sensor signal signature as a function of seed frequencies.

14. The arrangement according to claim 13, wherein the stage for determining the distance according to the object detection sensor signal signature in response to the seed frequency is adapted to determine the distance in response to reaching a maximum value of the object detecting sensor signal at a given frequency and/or in response to the given amplification value of the object detection sensor signal when changing the seed frequency and/or in response to a value within a frequency window around the seed frequency and/or in response to the strength of the seed frequency component in the object detecting sensor signal.

15. A method for position sensitive object distance determination using a frequency shifted feedback laser radiation from a frequency shifted feedback laser for object irradiation with laser radiation usable for distance measurement and a position sensitive object detection sensor;
wherein said laser radiation is split into an object beam for irradiating an object and a reference beam and the object beam is directed onto an object, and wherein laser radiation coming in from the object illuminated with said object beam is brought into interference with said reference beam at a position sensitive sensor and an intensity of the beat signal of said laser radiation coming in from the object illuminated with said object beam interfering with laser radiation coming in not from the object at the position sensitive sensor is determined as a distance indicative signal;
and wherein the intensity of said beat signal is increased beyond variations obtainable by fluctuations of the frequency shifted feedback radiation source by providing a modulation at the frequency shifted feedback radiation source for object irradiation.

16. An arrangement for distance measurements using a frequency shifted laser for distance measurements, comprising:
a frequency shifted feedback laser resonator having a pumped gain medium therein with a gain greater than or equal to unity so as to emit frequency shifted laser light changing with time in a chirping manner;
a means for splitting said emitted frequency shifted laser light changing with time in a chirping manner into an object beam for irradiating an object and a reference beam;
and an object detection sensor which receives laser light radiation coming back from an object illuminated with the object beam light and being at a distance to be determined and which object detection sensor also receives said reference beam via a reference path not including the object in such a manner that the laser light radiation coming back from the object and the reference beam interfere with one another, said interference producing a beat signal, said beat signal having a signal intensity allowing for the determination of the distance of the object in response to the intensity of the beat signal; and
wherein the frequency shifted feedback laser radiation source further comprises a means for injection of narrow banded, non-pumping, modulated seed laser light into the frequency shifted feedback resonator, said means for injection modulating the seed laser light such that said beat signal intensity is increased.

17. The arrangement according to claim 16, wherein the seed light has a wavelength close to the wavelength where the gain of the pumped gain medium is unity so that amplification of the seed laser light occurs at latest after a few resonator round trips.

18. The arrangement according to claim 16, wherein the seed laser light is modulated around a signature frequency of $$\delta v = \alpha \times c \times \delta_1,$$

wherein
$\alpha$=chirp rate,
c=speed of light, and
$\delta_1$=distance to be determined.

19. The arrangement according to claim 18, wherein the modulation frequency is periodically varied around the signature frequency of $\delta v = \alpha \times c \times \delta_1$.

20. The arrangement according to claim 19, wherein the seed laser light is modulated with a periodically varying modulation frequency.

21. The arrangement according claim 16, wherein the injection laser has a frequency width of less than 5% of the gain of the frequency shifted feedback laser radiation gain medium.

22. The arrangement according claim 21, wherein the injection laser is a single mode laser.

23. The arrangement claim 16, wherein the gain medium of the frequency shifted feedback laser is an optical fiber internal to the resonator and/or constituting the resonator.

24. An arrangement for distance measurements using a frequency shifted laser for distance measurements, comprising:
a frequency shifted feedback laser resonator having a pumped gain medium therein so as to emit frequency shifted laser light changing with time in a chirping manner;
a means for splitting said emitted frequency shifted laser light changing with time in a chirping manner into an object beam for irradiating an object and a reference beam;
and an object detection sensor which receives laser light radiation coming back from an object illuminated with the object beam light and being at a distance to be determined and which object detection sensor also receives said reference beam via a reference path not including the object in such a manner that the laser light radiation coming back from the object and the reference beam interfere with one another, said interference producing a beat signal, said beat signal allowing for the determination of the distance of the object in response to the beat signal;
wherein the frequency shifted feedback laser radiation source further comprises a means for injection of narrow banded, non-pumping, modulated seed laser light into the frequency shifted feedback resonator, and said means for injection modulates the seed laser light such that said beat signal is increased, and the arrangement further comprises a stage for changing the seed frequency with time and an object detection sensor signal evaluation stage for determining as a distance related measurement value a value representative for the time until a predetermined object signature is obtained by measuring the time until a maximum or threshold value is reached; and an analog maximum hold circuit for detection of a temporal signal curve having a related digital register for writing in of a sweep time or counter value for the seed frequency and further having a circuit for determination of a sweep-time or counter value for the seed frequency to be registered in response to reaching an analog threshold or maximum value, or wherein a derivation stage for deriving of the frequency dependent object detection sensor signal signature is provided.

25. The arrangement according to claim 24, wherein the object detection sensor is adapted for receiving and/or for evaluation of radiation received back from the irradiation of the object on the one hand and other light received back from the object on the other hand, simultaneously or in a timely close sequential manner; and wherein a frequency shifted feedback radiation source is adapted for emission in the infrared range and the object detection sensor is further adapted for receiving a visible light as said other light from the object.

26. An arrangement for distance measurements using a frequency shifted laser radiation source, said arrangement comprising:

an object detection sensor;

a frequency shifted feedback laser resonator having a pumped gain medium therein with a gain greater than unity so as to emit laser light having a plurality of frequency components changing with time in a chirping manner;

means for splitting said emitted laser light having said plurality of frequency components changing with time in a chirping manner into an object beam for irradiating an object and a reference beam, the object sensor being adapted to receive laser light radiation coming back from an object illuminated with the object beam light and being at a distance to be determined and also being adapted to receive said reference beam via a reference path not including the object in such a manner that the laser light radiation coming back from the object and the reference beam interfere with one another on the object sensor, said interference producing a signal by the beating of a plurality of frequency components that change with time in a chirping manner and which comprise laser light radiation coming back from said object illuminated with the object beam and beating with the plurality of frequency components that change with time in a chirping manner and which comprise the reference beam received at the sensor via said reference path not including the object, the intensity of said beat signal allowing for the determination of the distance of the object in response to the intensity of said beat signal;

wherein the frequency shifted feedback laser radiation source further comprises a means for injection of narrow banded, non-pumping, modulated seed laser light into the frequency shifted feedback resonator, said means for injection modulating the seed laser light such that said intensity of said beat signal is increased;

a filter for filtering the beat intensity related object sensor signals determined at the object detecting sensor wherein the filter is adapted for filtering of components changing the seed frequency;

a signal amplifier for an object detection sensor signal having an amplification stage subsequent to a filter stage and at least one regulating or control circuit for setting a given amplification of the sensor signal;

a stage for determining a distance in response to an object detection sensor signal signature as a function of seed frequencies, wherein the stage for determining the distance according to the object detection sensor signal signature in response to the seed frequency is adapted to determine the distance in response to reaching a maximum value of the object detecting sensor signal at a given frequency and/or in response to the given amplification value of the object detection sensor signal when changing the seed frequency and/or in response to a value within a frequency window around the seed frequency and/or in response to the strength of the seed frequency component in the object detecting sensor signal;

a stage for changing the seed frequency with time is provided and an object detection sensor signal evaluation stage determines as a distance related measurement value a value representative for the time until a predetermined object signature is obtained by measuring the time until a maximum or threshold value is reached; and an analog maximum hold circuit for detection of a temporal signal curve having a related digital register for writing in of a sweep time or counter value for the seed frequency and further having a circuit for determination of a sweep-time or counter value for the seed frequency to be registered in response to reaching an analog threshold or maximum value, or wherein a derivation stage for deriving of the frequency dependent object detection sensor signal signature is provided.

27. The arrangement according to claim 26, wherein:

the object detection sensor is adapted for receiving and/or for evaluation of radiation received back from the irradiation of the object on the one hand and other light received back from the object on the other hand, simultaneously or in a timely close sequential manner;

and a frequency shifted feedback radiation source is adapted for emission in the infrared range and the object detection sensor is further adapted for receiving visible light as said other light from the object.

28. An arrangement for distance measurements using a frequency shifted laser radiation source, said arrangement comprising:

an object detection sensor;

a frequency shifted feedback laser resonator having a pumped gain medium therein with a gain greater than unity so as to emit laser light having a plurality of frequency components changing with time in a chirping manner;

means for splitting said emitted laser light having said plurality of frequency components changing with time in a chirping manner into an object beam for irradiating an object and a reference beam, the object sensor being adapted to receive laser light radiation coming back from an object illuminated with the object beam light and being at a distance to be determined and also being adapted to receive said reference beam via a reference path not including the object in such a manner that the laser light radiation coming back from the object and the reference beam interfere with one another on the object sensor, said interference producing a signal by the beating of a plurality of frequency components that change with time in a chirping manner and which comprise laser light radiation coming back from said object illuminated with the object beam and beating with the plurality of frequency components that change with time in a chirping manner and which comprise the reference beam received at the sensor via said reference path not including the object, the intensity of said beat signal allowing for the determination of the distance of the object in response to the intensity of said beat signal;

wherein the frequency shifted feedback laser radiation source further comprises a means for injection of narrow banded, non-pumping, modulated seed laser light into the frequency shifted feedback resonator, said means for injection phase modulating the seed laser light, such that said intensity of said beat signal is increased;

wherein the seed laser light is modulated around a signature frequency of $$\delta v = \alpha \times c \times \delta_1,$$

wherein
$\alpha$=chirp rate,
c=speed of light, and
$\delta_1$=distance to be determined; and including a stage for determining a distance in response to an object detection sensor signal signature as a function of seed frequencies, wherein the stage for determining the distance according to the object detection sensor signal signature in response to the seed frequency is adapted to determine the distance in response to reaching a maximum value of the object detecting sensor signal at a given frequency and/or in response to the given amplification value of the object detection sensor signal when changing the seed frequency and/or in response to a value within a frequency window around the seed frequency and/or in response to the strength of the seed frequency component in the object detecting sensor signal.

* * * * *